United States Patent [19]
Dillon et al.

[11] 4,176,373
[45] Nov. 27, 1979

[54] SIGNAL PROCESSING FOR DISCRETE-SAMPLE-TYPE-COLOR-VIDEO SIGNAL

[75] Inventors: Peter L. P. Dillon, Pittsford; Bryce E. Bayer, Greece, both of N.Y.

[73] Assignee: Eastman Kodak Company, Rochester, N.Y.

[21] Appl. No.: 813,377

[22] Filed: Jul. 6, 1977

[51] Int. Cl.$^2$ .............................................. H04N 5/14
[52] U.S. Cl. ........................................ 358/37; 358/12; 358/21 R; 358/41; 358/138
[58] Field of Search ...................... 358/37, 12, 21, 138, 358/141

[56] References Cited
U.S. PATENT DOCUMENTS

| | | | |
|---|---|---|---|
| 2,921,124 | 1/1960 | Graham | 358/138 |
| 3,732,360 | 5/1973 | Breimer et al. | 358/37 |
| 3,789,133 | 1/1974 | Kline | 358/37 |
| 3,952,327 | 4/1976 | Hofman et al. | 358/37 |
| 3,971,065 | 7/1976 | Bayer | 358/41 |

OTHER PUBLICATIONS
"Integral Color Filter Arrays for Solid State Imagers," *IEEE Internatl. Elect. Device Meeting Conf. Papers,* Wash., D.C. 1976.

*Primary Examiner*—Richard Murray
*Attorney, Agent, or Firm*—T. H. Close

[57] ABSTRACT

Processing circuitry for discrete-sample-type-color-video signals performs an interpolation along a scan row or line to define intermediate signal levels between signal "updates" for the individual primary colors. In a preferred implementation, using green, red, and blue as primary colors, green samples occur more frequently than red or blue and interpolated green samples are specially combined to produce a "slow" green signal that is matched to the frequency ranges of the red and blue signals. The difference between the full green signal and the slow green signal is then used for producing a signal to represent high frequency luminance detail.

7 Claims, 6 Drawing Figures

COLOR DEMULTIPLEXER

IMAGER SAMPLING PATTERN
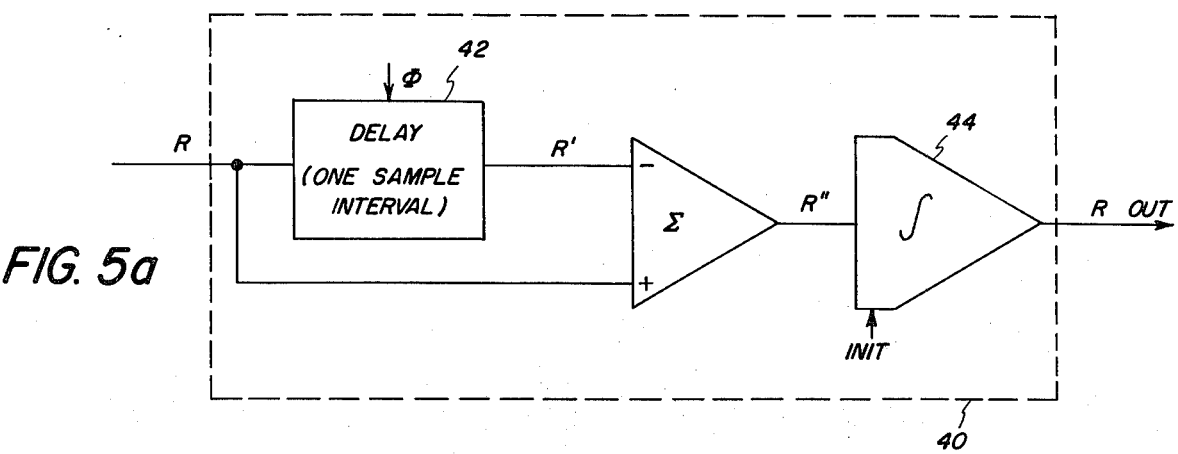
FIG. 3
G = GREEN
R = RED
B = BLUE
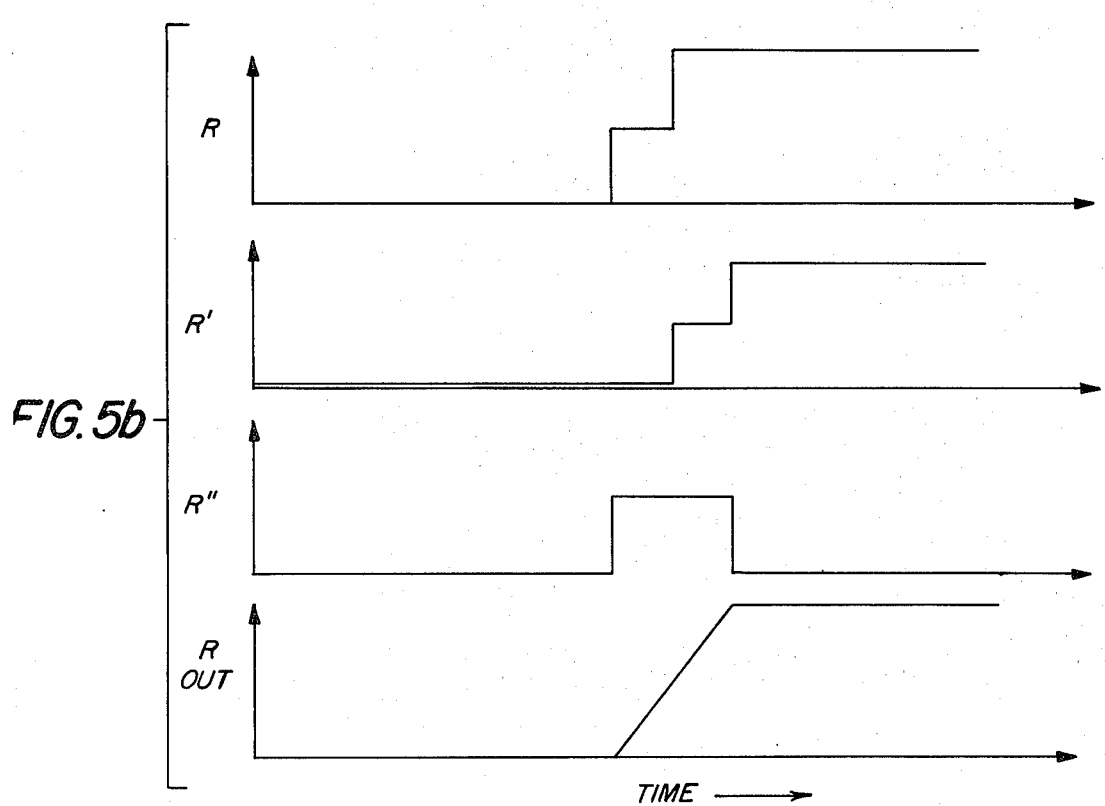
FIG. 5a
FIG. 5b

SIGNAL PROCESSING FOR DISCRETE-SAMPLE-TYPE-COLOR-VIDEO SIGNAL

CROSS-REFERENCE TO RELATED APPLICATIONS

Reference is made to commonly assigned, copending U.S. patent application Ser. No. 685,824, filed in the name of Peter L. P. Dillon on May 12, 1976 issued as U.S. Pat. No. 4,047,203, Sept. 6, 1977.

BACKGROUND OF THE INVENTION

1. Field of the Invention

The invention relates to processing circuitry for discrete-sample-type-color-video signals and more particularly to such circuitry which reduces artifacts of sampling and improves, at least apparently, the image detail of images resulting from such video signals.

2. Description Relative to the Prior Art

The conversion of a color image to an electrical signal representation by a color video imager typically involves either an elemental spot that scans continuously along a raster pattern or a grid of elemental areas that detect image information. In either case, the finite character of the sensing aperture results in a loss of image information. Because the image information that is successfully extracted by an imaging device is typically rather limited, specialized signal processing techniques are employed to maintain and to enhance, insofar as is possible, the quality of image representation.

For example, when image-representative signals are generated using a line scan process, as in a vidicon, it is known that certain degradation occurs as a result of the finite diameter of the scanning beam. Considering as an example a vertical edge in an image, only the leading portion of the beam initially "sees" the edge. Eventually the entire beam sweeps past the edge and is influenced by the edge transition. As a consequence of such operation, an abrupt edge transition tends to have a gradual influence on the scanning beam and, in effect, the edge is blurred. A somewhat similar effect, it will be appreciated, results with any image detail in the size range of the scanning beam.

To counteract this blurring effect, various "aperture correction circuits" (see e.g. U.S. Pat. No. 3,789,133) have been developed which function to amplify selectively high frequency scene information. By such boosting of high frequencies, these correction circuits reduce the undesirable loss of sharpness, albeit with some risk of amplifying noise inherent in the scanning device. It is also known in image signal processing that the green signal is closely related to the luminance response of the human visual system and may be aperture corrected, and used as the sole source of information regarding high-spatial-frequency image detail (see U.S. Pat. No. 3,732,360).

While such aperture correction techniques have been effective in upgrading the image-representative signals in line-scan-type systems such as single- and multi-tube color vidicons, they encounter problems when applied to the signals of elemental-area-type imagers, such as charge-transfer imaging devices, where image information is extracted as discrete samples. Such imagers provide discrete "updates," typically along respective element rows, rather than provide continuous line scan signals. The contrast in signal characteristics is even more significant where color imaging is performed on a "single chip" (see U.S. Pat. No. 3,971,065 and "Integral Color Filter Arrays for Solid State Imagers," Dillon et al, IEEE Int'l. Elec. Dev. Mtg. Conference Papers, Washington, D.C., 1976), because signal updates are staggered among the colors, and even the sampling frequency may vary with color.

As a result of the discrete sampling of such solid-state imagers, the color signals tend to exhibit sharp transitions at the boundaries of picture elements and mere amplification of high frequencies would only serve to worsen the artifacts of discrete sampling. Hence, known aperture correction techniques are not directly applicable to discrete area imaging devices and only tend to degrade the signals from such devices.

SUMMARY OF THE INVENTION

Video signal processing apparatus according to the invention interpolates to define intermediate levels between adjacent "updating events" (e.g. between successive green sample levels derived along a row of imager elements) of a discretely-updated color signal, such interpolation being preferably performed across a row by integrating differences between adjacent signal levels. Such integration is preferably implemented on a continuous basis by delaying the color signal for a sample period, subtracting the delayed signal from an undelayed version of that same color signal, and then integrating the resulting difference signal. By so modifying a discretely-updated color signal, a generally continuous signal is produced for which the artifacts resulting from sampling discontinuities prove to be significantly less noticeable. Furthermore, the preferred type of interpolation, which is essentially a linear interpolation, is more conservative of image detail than would be mere smoothing of the signal by more conventional low pass filtering.

To improve, furthermore, the representation of high frequency image detail, the signal for the primary color corresponding most closely to the luminance response characteristic of the human visual system, green—for a green, red and blue set of primary colors—is first processed to produce a slow-changing version corresponding to a fraction of the actual sampling rate (e.g. samples are alternately omitted). The fraction is preferably chosen to match the frequency range of the "slow" green signal to that for the red and blue signals. Such slow green signal, in interpolated form (see discussion above), is then differenced from an interpolated version of the full sampling rate signal for that color to produce a signal for representing high frequency luminance detail. This "high frequency luminance" difference signal is then added to each of the interpolated signals for the various primary colors to produce an augmented set of generally continuous primary color signals. By so producing the augmented signals, high frequency detail is retained but is effectively driven to neutral so that color banding problems are not introduced at sharp image transitions. Note in this regard it is possible to render an edge accurately in a neutral monochrome with less high frequency information than would be necessary to render the same edge in color and human eye response is such that the difference is typically not noticeable.

In a presently preferred implementation, green image detail is, on average, sampled at twice the rate of red or blue (i.e. in the incoming video signal green is updated twice as frequently as red and blue; see U.S. patent application Ser. No. 685,824 filed May 12, 1976 issued as U.S. Pat. No. 4,047,203). Two slow green signals are generated by omitting signal updates on an alternating basis. These slow green signals are interpolated and then averaged to provide a signal representative of low-frequency green image information. The averaged slow green signal is then differenced from an interpolated full-sampling-rate green signal to provide a signal representative of high frequency luminance, which is added to interpolated versions of the red and blue signals, and to the averaged slow green signal. Hence, for improved representation of detail as mentioned above, the high frequency information for all three color signals is derived from the same set of samples ... the green samples which correspond to the highest individual color sampling rate, and hence the broadest bandwidth image information.

In a further refinement, according to the invention, the full sampling rate green signal is enhanced as a source of information regarding high frequency detail by producing a weighted average of adjacent green samples. Such weighted average is produced using selectively delayed versions of such green signal (the delays being matched to the sample period) as is discussed more fully below.

The invention will now be described in detail with reference to the drawings wherein.

Figure 4:
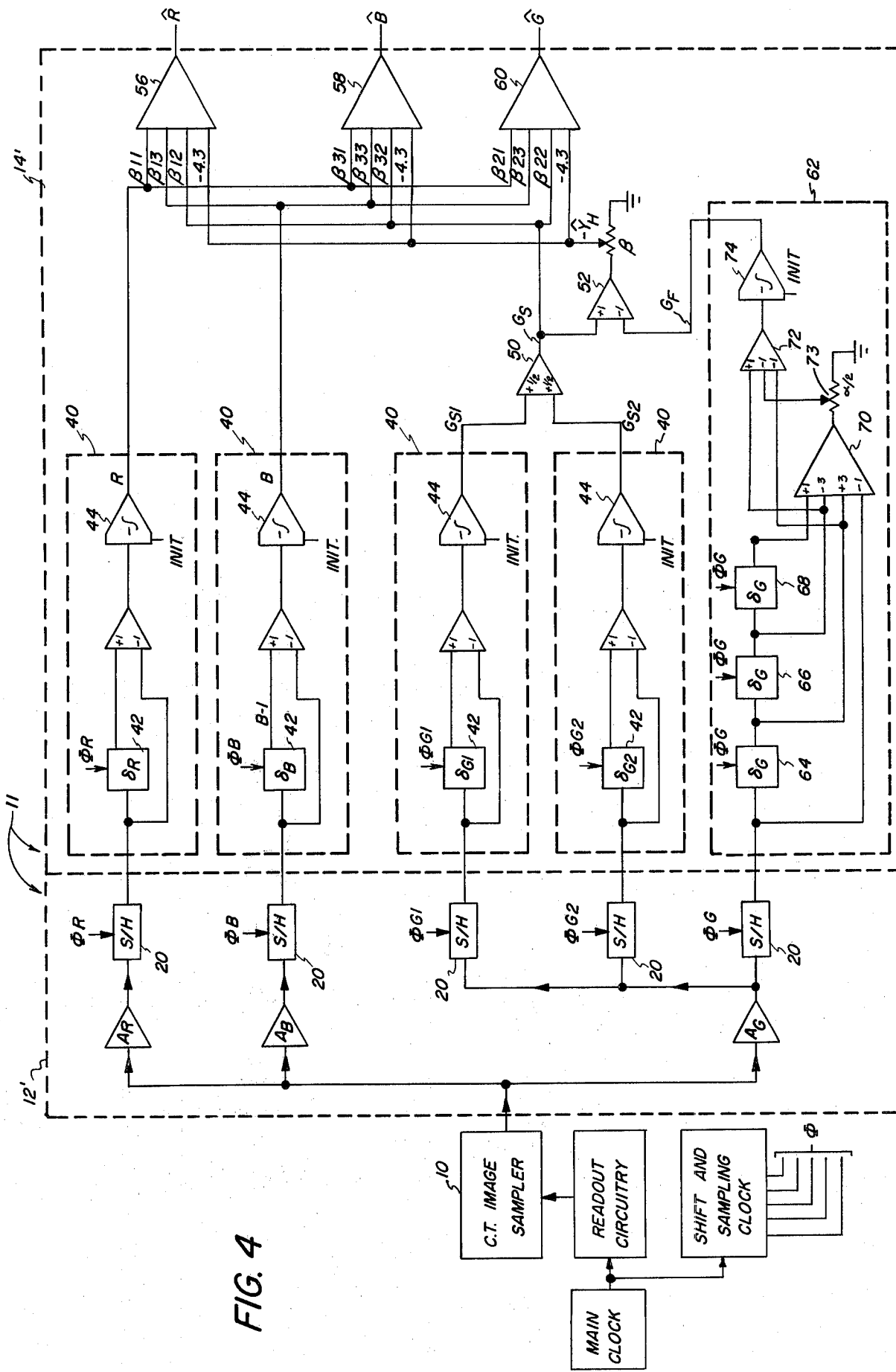

FIG. 3 indicates a presently preferred color sampling pattern of an elemental area imager (image sampler for use with the invention;

FIG. 4 is a diagram in block form of a presently preferred signal processing apparatus;

FIG. 5A is a block diagram of a circuit for use in practicing the invention; and FIG. 5B is a set of graphical representations indicating the operation of an interpolator circuit for use with the invention.

Figure 1:
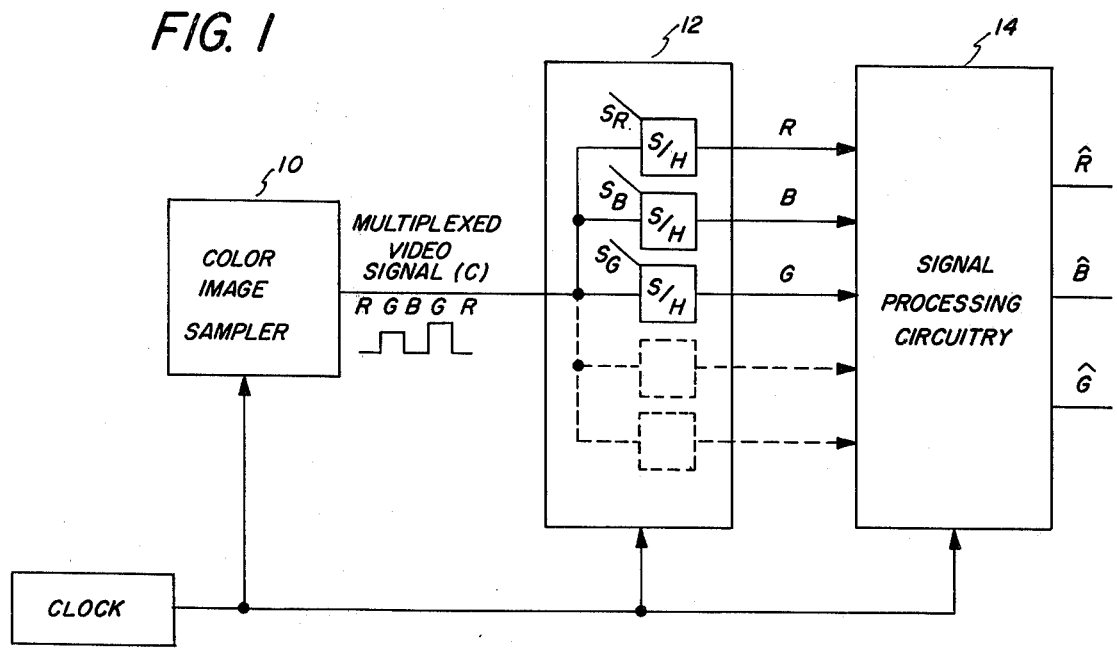
FIG. 1 is a simplified block diagram illustrating signal processing according to the invention.
Figure 2:
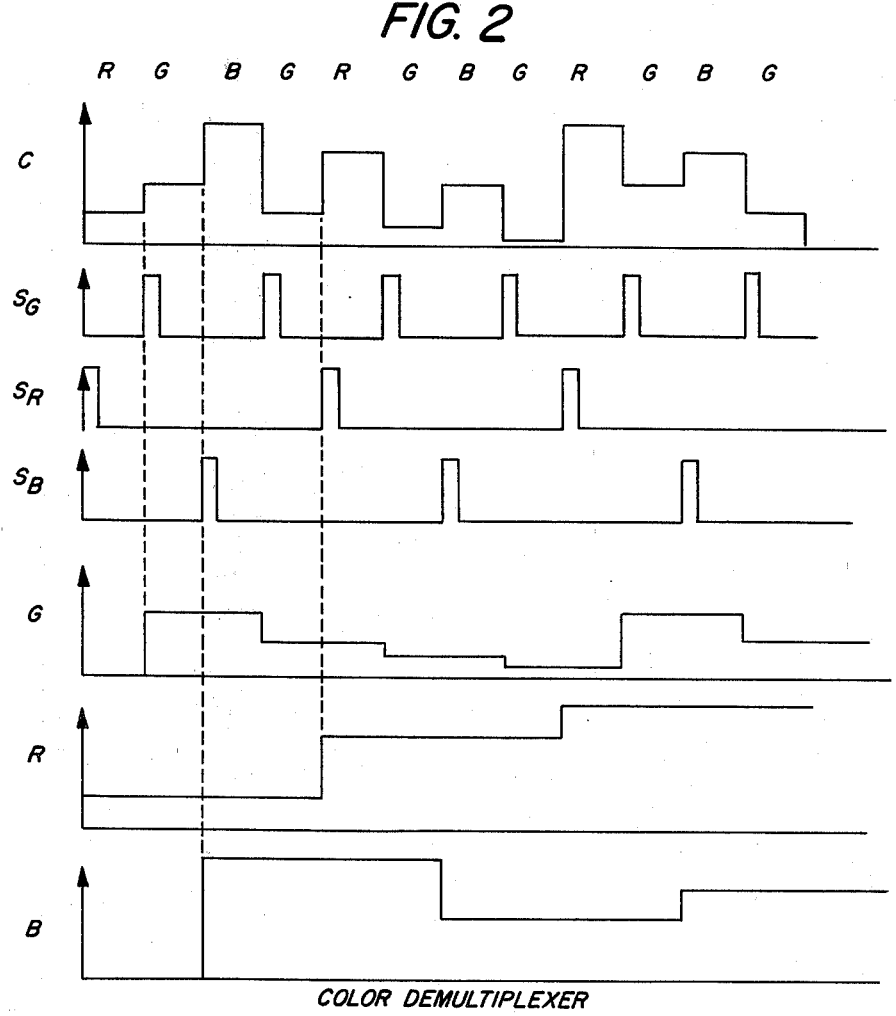
FIG. 2 is a timing diagram indicating the operation of a demultiplexer used in practicing the invention.

Referring to FIG. 1 for a simplified overview of a progression of video signal modifications according to the invention, a discrete area image sampler 10, which may for example, include one or more charge-transfer-type imagers, produces a video signal set c. Assuming, as is presently preferred, a time-division-multiplexed set of signals for green, red, and blue (denoted G, R and B, respectively) a demultiplexer 12 is employed to produce individual pulse or "box car" type signals for such colors (dashed lines serve to indicate additional channels for "partial sample population demultiplexing" as is discussed below). The demultiplexer may comprise a series of sample-and-hold circuits as is well known; and a simplified timing diagram for such circuits is indicated in FIG. 2, $S_G$, $S_R$, $S_B$ denoting "sample green," "sample red," and "sample blue," etc. The separated color signals (see the last three plots of FIG. 2) are supplied to a signal processor 14 where the signals are modified according to the invention to afford improved image representation. A preferred imager sampling pattern for use in providing the video signal set c is indicated in FIG. 3. Such pattern, it should be noted, includes green elements at twice the rate of red or blue elements; and a technique according to the invention for exploiting the resulting nonuniform color sample rates is explained below.

Referring to FIG. 4, in a presently preferred implementation of the invention, a signal processing apparatus 11 cooperates with an image sampler 10 (See FIG. 3) which produces a time-division-multiplexed signal having green, red and blue image sample information intermixed.

A demultiplexer 12' (primes are used to indicate particular implementations of elements already discussed generally) receives the image sample signal and using sample-and-hold circuits 20 generates a set of discrete-time color signals. For the presently preferred implementation, five such color signals are produced: a full green signal based on all of the green samples ($G_F$); a red signal based on all of the red samples (R); a blue signal based on all of the blue samples (B); a first slow green signal based on every other green sample ($G_{S1}$); and a second slow green signal ($G_{S2}$) based on the green samples omitted for the first slow green signal. Synchronization of the sampling is achieved using clocking pulses along the lines indicated in FIG. 2.

The discrete-time color signals are supplied to a signal processing circuit 14' which produces output color signals $\hat{R}$, $\hat{B}$, and $\hat{G}$. Signal upgrading according to the invention involves an interpolation, which is preferably performed by integrating differences between adjacent samples for the respective discrete color signals as mentioned above. It is contemplated, however, that a higher order interpolation may be employed to advantage. An interpolating apparatus 40 is included in each of the signal channels except the full green channel where interpolation is combined with another operation as is discussed below. A presently preferred form for apparatus 40 (see FIG. 5A) utilizes a delay device 42, the delay of which corresponds to the period for the respective discrete-time color signal. An analog shift register may be used for the delay device 42 and a clocking signal input $\Phi$ has accordingly been indicated.

An integrator 44 produces a signal representing the integrated difference between the delayed and a relatively undelayed version of the discrete-time color signal. At the end of each row of signal image information, the integrator 44 is initialized to a zero level. By integrating sample-to-sample differences along a row in this manner the output signal of integrator 44 is caused to represent a first order linear interpolation between color sample levels (see FIG. 5B).

The slow green signals $G_{S1}$ and $G_{S2}$ are averaged at a summing device 50 and the average slow green signal is differenced from the full green signal $G_F$ at a summing device 52 to produce a signal $\hat{Y}_H$ for representing high-frequency luminance. Such signal ($\hat{Y}_H$) is added to the red and blue and slow green signals at summers 56, 58 and 60, respectively. By sampling green (the primary color most like luminance) at a higher rate, as was mentioned above, a detailed high frequency luminance signal is provided for addition to all three primary color signals. It will be appreciated that for the high frequency component of all three color signals the highest sampling rate information is used whereas the low sampling rate information for the respective colors is used to develop the low frequency color signal components. By adding the luminance signal to all three color signals and hence driving the high frequency detail to be neutral, undesirable color banding effects at edges are reduced or obviated as was mentioned above. While the full green channel might have been used as the output signal $\hat{G}$, the use of the summer 60 advantageously facilitates the introduction of color matrixing at the bank of summers 56, 58, 60, matrixing coefficients ($\beta$) being indicated for the signal inputs to those summers.

In a refinement for the invention the full-green signal is made more effective as the signal for representing high frequency detail by producing a weighted average of adjacent samples. An enhancement circuit 62 which incorporates an interpolation of the type provided by the apparatus 40 discussed above is indicated in the full-green signal channel in FIG. 4. Preferred enhancement circuitry includes delays 64, 66 and 68 which are matched to the sampling period for the full green signal. (Again, analog shift registers may be used to provide the delays and clocking signals Φ have been indicated.) The objective of processing by the circuit 62 is to multiply the relatively undelayed signal and the doubly delayed signal by a weighting coefficient $-\alpha/2$ and to multiply the single delayed signal by $1+\alpha$. Such weighting coefficient $\alpha$ is empirically chosen to provide the best apparent picture quality. However, for the presently preferred implementation, a weighting of adjacent samples to enhance high frequencies and an interpolation (along the lines provided by the circuit 40) are combined in the circuit 62 using the gains shown at a summing device 70 and a summing device 72, in conjunction with the scaling of a potentiometer 73. The output of device 72 is supplied to an integrator 74 which produces the enhanced full-green signal. The preferred configuration for circuit 62 has the special advantage of concentrating adjustment of the empirical coefficient $\alpha$ at a single point, namely the potentiometer.

The invention has been described in detail with reference to the figures; however, it will be appreciated that variations and modifications are possible which are within the spirit and scope of the invention. For example, a color corresponding closely to the luminance response of the human eye could be used as a primary color rather than green, and respective color sampling rates other than those indicated for the presently preferred implementation might be used. Further, an imaging apparatus with separate imagers for each color might serve to produce the color video signal, i.e., act as the image sampler. Also, a record/playback step could be inserted, say, between any of the various elements indicated in FIG. 1. Furthermore, while interpolation and enhancement have been described by use of only adjacent elements within a single line, both of these functions could be carried out with potential advantage using a greater number of elements within a single line and also elements from neighboring lines.

What is claimed is:

1. For use with a video camera having imaging apparatus for producing a discrete-sample-type-multicolor video signal representative of elemental areas of an image for a set of primary colors, such areas being arranged based on a predefined row-by-row scanning pattern to define respective sampling frequencies and periods for such primary colors, said multicolor video signal representing discrete, periodic updates of said set of primary colors, said updates being staggered among the colors of said set, signal processing apparatus comprising:
    (A) means for decoding such video signal to produce a corresponding set of discrete-sample-type-single-color-signals for the respective primary colors, which discrete-sample-type-single-color-signals represent periodic updates of respective primary colors at intervals determined by the corresponding color sampling frequency; and
    (B) interpolating means for producing generally continuous primary-color signals in accordance with said discrete-sample-type-single-color-signals, said interpolating means including
        (1) respective color signal delay means for receiving the discrete-sample-type-single-color signals, said means having a time delay characteristic matched to the sampling period for the corresponding primary color, and
        (2) respective integrating means cooperative with said signal delay means for producing a continuous color signal by integrating the difference between the delayed version and the relatively undelayed version of the corresponding discrete-sample-type-single-color signal.

2. Signal processing apparatus for a video signal of a type representing red, blue and green image samples in a repeating sequence which defines sampling rates for the respective colors, said apparatus comprising:
    (A) decoding means for producing a set of pulse-type signals based, respectively, on such red, blue and green samples, said signals having pulse frequencies corresponding to the respective color sampling rates, said decoding means including sampler means for producing at least one relatively slow-changing-green pulse-type signal based on a fraction of the green samples of the sequence thereof; and
    (B) processing means for receiving said pulse-type signals and for producing based thereon generally continuous image-representative signals for red, blue and green, said processing means including
        (1) respective pulse-type signal interpolating means for smoothing the red, blue, green and slow-changing green signals to remove abrupt level transitions;
        (2) differencing means for subtracting the slow-changing green signal from the other green signal to produce a luminance-estimating signal for relatively high spatial frequencies; and
        (3) means for adding the luminance-estimating signal to the interpolated red, blue and slow-changing green-representative signals to produce red, blue and green signal outputs, whereby the interpolated red, blue and green signal outputs share a signal component for representing high frequency luminance detail.

3. Signal processing apparatus for a video signal of a type representing red, blue and green image samples in a repeating sequence wherein the green sample rate is twice that for red and blue, said apparatus comprising:
    (A) decoding means for producing a set of pulse-type signals based, respectively, on such red, blue and green samples, said signals having pulse frequencies corresponding to the respective color sampling rates, said decoding means including sampler means for producing at least one relatively slow-changing-green pulse-type signal based on a fraction of the green samples of the sequence thereof; and
    (B) processing means for receiving said pulse-type signals and for producing based thereon generally continuous image-representative signals for red, blue and green, said processing means including
        (1) respective pulse-type signal interpolating means for smoothing the red, blue, green and slow-changing green signals to remove abrupt level transitions;
        (2) differencing means for subtracting the slow-changing green signal from the other green signal to produce a luminance-estimating signal for relatively high spatial frequencies; and (3) means for adding the luminance estimating signal to the interpolated red, blue and slow-changing green representative signals to produce red, blue and green signal outputs, whereby the interpolated red, blue and green signal outputs share a signal component for representing high frequency luminance detail.

4. Apparatus according to claim 3 wherein said interpolating means respectively include a delay means for delaying the corresponding signal by a period sufficient to match the sampling period for that signal, and means for integrating the difference between the delayed signal and the relatively undelayed signal, thereby to produce an interpolated output signal, and wherein said sampler means for producing at least one slow-changing green signal includes means for producing two slow-changing green signals by alternately allocating green samples to the one signal and then the other.

5. Video camera apparatus comprising:
(A) an elemental-area-type imaging device having rows of elements with predefined repeating patterns of color sensitivities for three primary colors, which patterns define sampling rates for such respective primary colors;
(B) readout means for interrogating the elements of said imaging device on a row-by-row basis to produce one or more sample information signals representing sample levels for the respective primary colors;
(C) decoding means for receiving said sample information signals and for producing based thereon image representative pulse-type signals for the respective primary colors, such signals having individual pulse rates in accordance with the corresponding color sampling rate; and
(D) means for producing continuous-type signal outputs for the respective primary colors based on a polynomial interpolation between adjacent pulse levels of the corresponding pulse-type signals.

6. Apparatus according to claim 5 wherein:
(A) said imaging device includes green-sensitive elements at every other position along a row and blue- or red-sensitive elements are dispersed in the remaining row positions;
(B) said decoding means includes sampler means for producing at least one relatively slow-changing-green signal based on very other green sample;
(C) said apparatus includes differencing means including means for interpolating said relatively slow-changing-green signal to produce a continuous-type slow-changing-green signal, and for producing an augmenting signal based on the difference between the continuous-type-green signal and the continuous-type slow-changing-green signal; and
(D) said apparatus includes summing means for adding the augmenting signal to the red, blue, and slow-changing-green continuous-type-color-signals.

7. Apparatus according to claim 6 wherein said interpolating means includes delay means matched to the sample period for the corresponding signal and integrating means for integrating the difference between the output of said delay means and a signal corresponding to the input to said delay means to produce a continuous-type output signal.

* * * * *